United States Patent
Stamper (10) Patent No.: US 11,341,238 B2
(45) Date of Patent: May 24, 2022

(54) ELECTRONIC DEVICE INTRUSION DETECTION

(71) Applicant: Aptiv Technologies Limited, St. Michael (BB)

(72) Inventor: Abram J. Stamper, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 247 days.

(21) Appl. No.: 16/564,224

(22) Filed: Sep. 9, 2019

(65) Prior Publication Data

US 2021/0073378 A1 Mar. 11, 2021

(51) Int. Cl.
- *H04L 9/40* (2022.01)
- *G06F 21/55* (2013.01)
- *H04W 12/128* (2021.01)
- *H04L 29/06* (2006.01)

(52) U.S. Cl.
CPC ............ *G06F 21/554* (2013.01); *H04L 63/08* (2013.01); *H04L 63/12* (2013.01); *H04L 63/1408* (2013.01); *H04L 63/1441* (2013.01); *H04W 12/128* (2021.01)

(58) Field of Classification Search
CPC ............... G06F 21/554; H04W 12/128; H04L 63/1408; H04L 63/1441
See application file for complete search history.

(56) References Cited

U.S. PATENT DOCUMENTS

| | | | |
|---|---|---|---|
| 7,185,367 B2 * | 2/2007 | Munson | G06F 11/3612 714/E11.209 |
| 2007/0209075 A1 | 9/2007 | Coffman | |
| 2008/0262991 A1 * | 10/2008 | Kapoor | H04L 63/14 706/20 |
| 2011/0161452 A1 * | 6/2011 | Poornachandran | G06F 21/554 709/207 |

(Continued)

FOREIGN PATENT DOCUMENTS

| | | |
|---|---|---|
| DE | 102015205670 A1 | 6/2016 |
| EP | 3428827 | 1/2019 |
| WO | 2018233891 | 12/2018 |

OTHER PUBLICATIONS

"Extended European Search Report", European Application No. 20193814.9, dated Oct. 19, 2020, 6 pages.

(Continued)

*Primary Examiner* — Ali S Abyaneh
(74) *Attorney, Agent, or Firm* — Sawtooth Patent Group PLLC (57) ABSTRACT

A method for detecting an intrusion (i.e. hacking) of an electronic device includes determining an expected activity value associated with one or more software applications executing on a processor, monitoring the one or more software applications executing on the processor to determine a current activity value associated with the one or more software applications, determining whether the current activity value exceeds a threshold associated with the expected activity value, and in response to determining that (Continued)

the current activity value exceeds the threshold, initiating one or more security actions associated with the one or more software applications. A system for detecting an intrusion of an electronic device includes an intrusion detection module configured to perform the steps of the method.

20 Claims, 4 Drawing Sheets

(56) References Cited

U.S. PATENT DOCUMENTS

| | | | |
|---|---|---|---|
| 2012/0210428 A1 | 8/2012 | Blackwell | |
| 2012/0317645 A1* | 12/2012 | Fortier | G06F 21/562 |
| | | | 726/24 |
| 2014/0259167 A1* | 9/2014 | Babu | G06F 21/55 |
| | | | 726/23 |
| 2015/0113638 A1* | 4/2015 | Valasek | G06F 21/562 |
| | | | 726/22 |
| 2015/0163121 A1* | 6/2015 | Mahaffey | H04W 12/12 |
| | | | 707/687 |
| 2015/0271201 A1 | 9/2015 | Ruvio et al. | |
| 2016/0219028 A1 | 7/2016 | Baltes et al. | |
| 2016/0255104 A1 | 9/2016 | Eslambolchi et al. | |
| 2017/0097857 A1* | 4/2017 | Yang | H04W 4/80 |
| 2018/0039558 A1* | 2/2018 | Shiraishi | G06F 8/65 |
| 2018/0367570 A1 | 12/2018 | Verma et al. | |
| 2018/0367571 A1 | 12/2018 | Verma et al. | |

OTHER PUBLICATIONS

Kang, et al.: "Intrusion Detection System Using Deep Neural Network for In-Vehicle Network Security", PLOS One, Jun. 7, 2016, pp. 1-17.

* cited by examiner

ELECTRONIC DEVICE INTRUSION DETECTION

TECHNICAL FIELD OF INVENTION

This disclosure generally relates to electronic devices that execute software applications.

BACKGROUND OF INVENTION

It is desirable to detect intrusion of an electronic device that executes a software application.

SUMMARY OF THE INVENTION

Described herein are techniques for detecting intrusion of an electronic device executing one or more software applications. In some examples, the techniques include detecting when an electronic device is operating in an unexpected manner. As used herein, the term "intrusion" is used to refer to instances when a software application on an electronic device is modified, or unauthorized software is installed such that the electronic device operates in a manner that is unexpected, unauthorized, or otherwise inconsistent with the intended operation of the electronic device. Acts of intrusion by persons or computers to make unauthorized modifications to a software application, or install unauthorized software on an electronic device is commonly referred to as hacking. Prior attempts to detect hacking did so by monitoring (i.e. listening to) communications (e.g. CAN, Wi-Fi, cellular network, DSRC) to and from the electronic device. However, monitoring communications alone is unable to detect certain types of hacking that do not cause a detectable change in communications.

Described herein is a system that includes an intrusion detection module. The intrusion detection module is configured to: determine an expected activity value associated with one or more software applications executing on a processor, monitor the one or more software applications executing on the processor to determine a current activity value associated with the one or more software applications, and determine whether the current activity value exceeds a threshold associated with the expected activity value. In response to determining that the current activity value exceeds the threshold, the intrusion detection module is configured to initiate one or more security actions associated with the one or more software applications.

Also described herein is a method that includes: determining an expected activity value associated with one or more software applications executing on a processor, monitoring the one or more software applications executing on the processor to determine a current activity value associated with the one or more software applications, and determining whether the current activity value exceeds a threshold associated with the expected activity value. In response to determining that the current activity value exceeds the threshold, the method includes initiating one or more security actions associated with the one or more software applications.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

An electronic device executing one or more software applications is expected to operate in some predictable or expected manner. That such an electronic device is operating in an unexpected manner may be an indication that the electronic device has been 'hacked'. Hacking is a colloquial term used to indicate that the electronic device has been the subject of a physical or electronic intrusion to, for example, modify an existing software application or install a new unwanted software application. Hacking of electronic devices includes, but is not limited to, installing unknown/malicious software, and/or changing a programmable configuration of the electronic device.

Many vehicles are equipped with one or more electronic devices that execute one or more software applications. Hacking one or more of these electronic devices may cause the vehicle to operate in an unexpected manner. As one example, a hacked device may cause the vehicle to unexpectedly stop. As another example, a hacked device may cause an infotainment system in the vehicle to operate in an unexpected manner. For example, the infotainment system may unexpectedly increase the volume of sound emitted by the infotainment system, or play undesired music when a particular music genre is requested. Furthermore, some examples of hacking may not cause an outwardly detectable form of unexpected behavior. As one example, an outside entity may utilize processing power of a hacked device in an unauthorized manner and/or gather information (e.g., a credit card number) about a user of the electronic device. Described herein are techniques for determining and/or responding to instances of an electronic device operating in an unexpected manner while executing one or more software applications.

Figure 1:
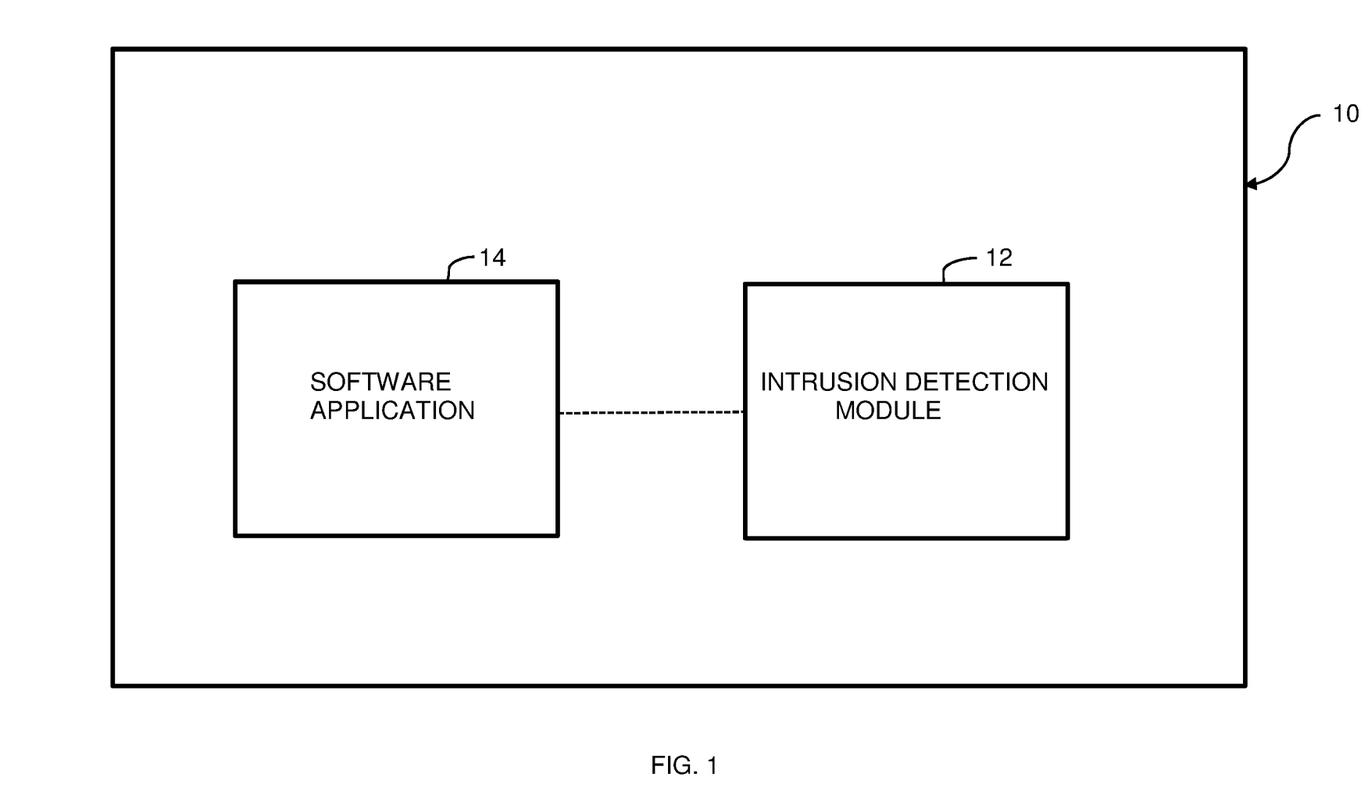
FIG. 1 is one diagram of an intrusion detection module in accordance with one embodiment.

FIG. 1 illustrates one non-limiting example of a system 10 that includes an intrusion detection module 12. The intrusion detection module 12 monitors (indicated by the dashed line) one or more aspects of activity associated with the execution of one or more software applications 14. Hereafter, this disclosure sometimes refers to the one or more software applications 14 as the software application 14. The intrusion detection module 12 detects an instance of intrusion (e.g. hacking) by comparing a current activity value associated with the software application 14 to an expected activity value associated with the software application 14. If the current activity value does not correspond to the expected activity value, i.e., if the current activity value has an unexpected value, then the intrusion detection module 12 may initiate one or more security actions to mitigate potential effects of the intrusion.

The technique by which the intrusion detection module 12 monitors the software application 14 includes, but is not limited to, monitoring the value of a variable generated by the software application 14, monitoring an amount of reads and/or writes to memory accessed by the software application 14, monitoring an amount of memory utilized by the software application 14, monitoring a response time to generate an output in response to an input received by the software application 14, monitoring an amount of calculations performed by the software application 14, monitoring an amount (e.g. percentage) total processing power utilized by the software application 14, or any combination thereof.

Figure 2A:
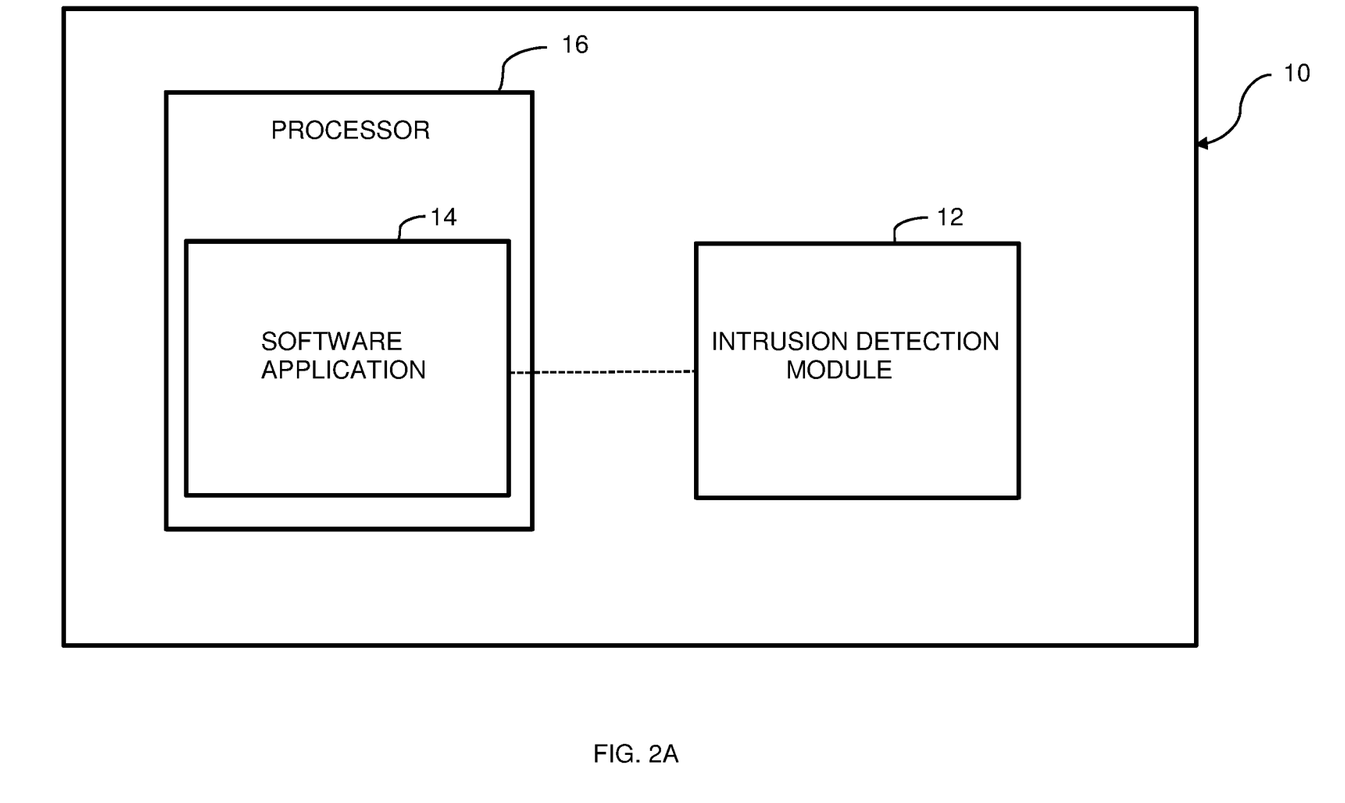
FIG. 2A is another diagram of an intrusion detection module in accordance with one embodiment.

FIG. 2A illustrates one non-limiting example of the system 10 where the software application 14 is executing on a processor 16. By way of example, the processor 16 may be any one or combination of, but is not limited to, a microprocessor (µP), a signal processor (e.g. DSP), a processing unit (e.g. GPU, CPU, ALU, FPGA), or other control circuitry such as analog and/or digital control circuitry including an application specific integrated circuit (ASIC) for processing data, as should be evident to those in the art. In this example, hardware associated with the intrusion detection module 12 is separate from the processor 16.

Figure 2B:
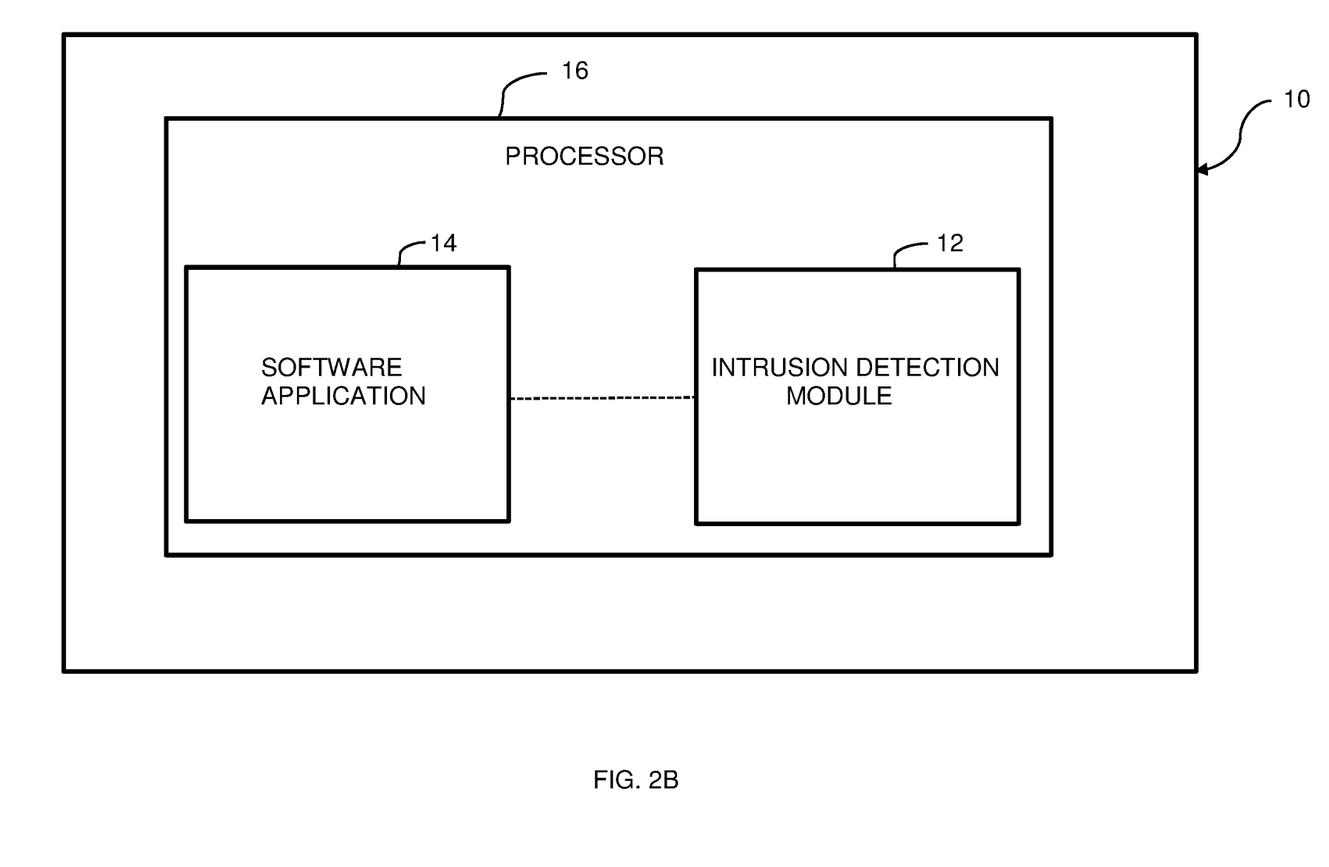
FIG. 2B is another diagram of an intrusion detection module in accordance with one embodiment.

FIG. 2B illustrates another non-limiting example of the system 10 where the intrusion detection module 12 and the software application 14 reside on the same instance of the processor 16. In one example, the intrusion detection module 12 is a software routine that operates in conjunction with or in parallel with the software application 14.

In some examples of the system 10, the processor 16 is part of an electronic device. Of particular interest are examples of electronic devices found on vehicles such as, but not limited to, automobiles (personal/owner operated, taxi, automated mobility on demand or AMOD), and people/cargo transportation vehicles (e.g. truck, bus, train, airplane, boat/ship). Examples of the electronic device found on a vehicle include, but are not limited to, a computing system of the vehicle, e.g. an engine control unit (ECU) or engine control module (ECM), an infotainment unit, a heating, ventilation, and air conditioning (HVAC) controller, and an autonomous vehicle control unit. However, the teachings presented herein are relevant to any example of electronic device configured so that a software application on the electronic device can be modified or updated by any means. The means to modify or install a software application may include, but is not limited to, a wired connection (e.g. wire, fiber optic), a wireless connection (e.g. RF signal, infrared signal), or by manual manipulation of configuration files or switches of the electronic device by a user. As will be described in more detail below, the intrusion detection module 12 monitors activities of the processor 16 that are often not detectable by merely monitoring communications to and from the processor 16 or the electronic device.

The intrusion detection module 12 determines an expected activity value associated with one or more software applications executing on the processor 16. In some examples, the expected activity value is a predetermined stored value. In one example, the intrusion detection module 12 determines the expected activity value by recalling from a memory or storage device a value that was previously stored. By way of example, the expected activity value may be stored in the processor 16 when the software application 14 is installed on the processor 16. In some examples, the previously stored value of the expected activity value is based on an observation by a software engineer. The software engineer may perform the observation during validation testing of the software application 18.

In other examples, the expected activity value is a dynamically determined value learned while the processor 16 operates. In one example, the expected activity value is based on historical observations by the intrusion detection module 12. In one example, the historical observations occur during validation testing of the software application 14. In another example, the historical observations occur following the installation of the software application 14 onto the processor 16. In other examples, the expected activity value is based on one or more of, but is not limited to, a historical processor usage of the software application 14 executing on the processor 16; a historical memory usage of the software application 14 executing on the processor 16; and/or a historical network usage of the software application 14 executing on the processor 16. In yet another example, the expected activity value associated with the software application 14 is based on a statistical analysis of activity associated with the software application 14. In some examples, the statistical analysis includes calculating an average and/or a standard dedication of one or more activities associated with the software application 14.

The intrusion detection module 12 monitors the one or more software applications 14 executing on the processor 16 to determine a current activity value associated with the software application 14. In some examples, the current activity value is based on a current processor usage of the one or more software applications executing on the processor. An unexpected increase in the current processor usage may be an indication that the software application 14 was modified, for example, to collect and/or transmit information available from the software application 14 without permission from the system 10. In one example, the intrusion detection module 12 determines the current processor usage by monitoring the value of a variable indicative of processor usage, e.g., a percentage of processor usage. In another example, the intrusion detection module 12 determines the current processor usage by installing a subroutine into the processor 16 that causes the processor 16 to output a value indicative of current processor usage on a periodic basis.

In other examples, the current activity value is based on a current memory usage by the software application 14. An unexpected increase in the current memory usage may be an indication of the software application 14 having been modified, for example, to store information available from the software application 14 for later retrieval or transmission, without permission from the system 10. In one example, the intrusion detection module 12 determines the current memory usage by monitoring the value of a variable indicative of memory usage present in the processor 16. In another example, the intrusion detection module 12 determines the current memory usage by installing a subroutine into the processor 16 that causes the processor 16 to output the value of a variable indicative of memory usage on a periodic basis.

In other examples, the current activity value is based on a current network usage of the software application 14. An unexpected change (e.g., an increase) in the current network usage may be an indication that information from the software application 14 is being communicated to some other entity without permission from the system 10.

In other examples, the current activity value associated with the software application 14 is based on a change to a configuration file. An unexpected change to a configuration file may be an indication that communication with an unauthorized entity has been enabled without permission from the system 10.

In other examples, the current activity value is based on a response by the system to a user input. For example, a user input (e.g. touch screen or personal computer interface) may make unauthorized or undesirable modification to the software application 14 without permission from the system 10.

As suggested above, the intrusion detection module 12 compares the current activity value to the expected activity value to detect an instance of intrusion. In one example, the intrusion detection module 12 is configured to determine whether the current activity value exceeds a threshold associated with the expected activity value. In one example, the threshold is a percentage greater than one-hundred-percent (100%) of the expected activity value. As a specific non-limiting value, the threshold is 133% of the expected value. That is, an intrusion is indicated if the current activity value exceeds 133% of the expected activity value.

In response to determining that the current activity value exceeds the threshold, the intrusion detection module 12 initiates one or more security actions associated with the one or more software applications 14. In one example, the security action includes halting execution of the one or more software applications 14. In another example, the security action includes disconnecting (i.e. blocking or disabling) a communications link associated with the processor 16. In another example, the security action includes preventing the processor 16 from accessing (i.e. starting or activating) the software application 14. In another example, the security action includes deleting the software application 14 from memory associated with or accessed by the processor 16. In yet another example, the security action includes communicating a warning indicating that the current activity value exceeds the threshold. The warning includes one or more of a user prompt, and an incident report. Other examples include combinations of these security actions and/or other security actions known to those in the art.

Also described herein is a non-transitory computer readable storage medium, (e.g. memory) in the processor 12, that stores instructions configured to cause a processing-device (e.g. the processor 16) to: determine an expected activity value associated with one or more software applications 14 executing on a processor 16; monitor the one or more software applications 14 executing on the processor 16 to determine a current activity value associated with the one or more software applications 14; determine whether the current activity value exceeds a threshold associated with the expected activity value; and in response to determining that the current activity value exceeds the threshold, initiate one or more security actions associated with the one or more software applications.

Figure 3:
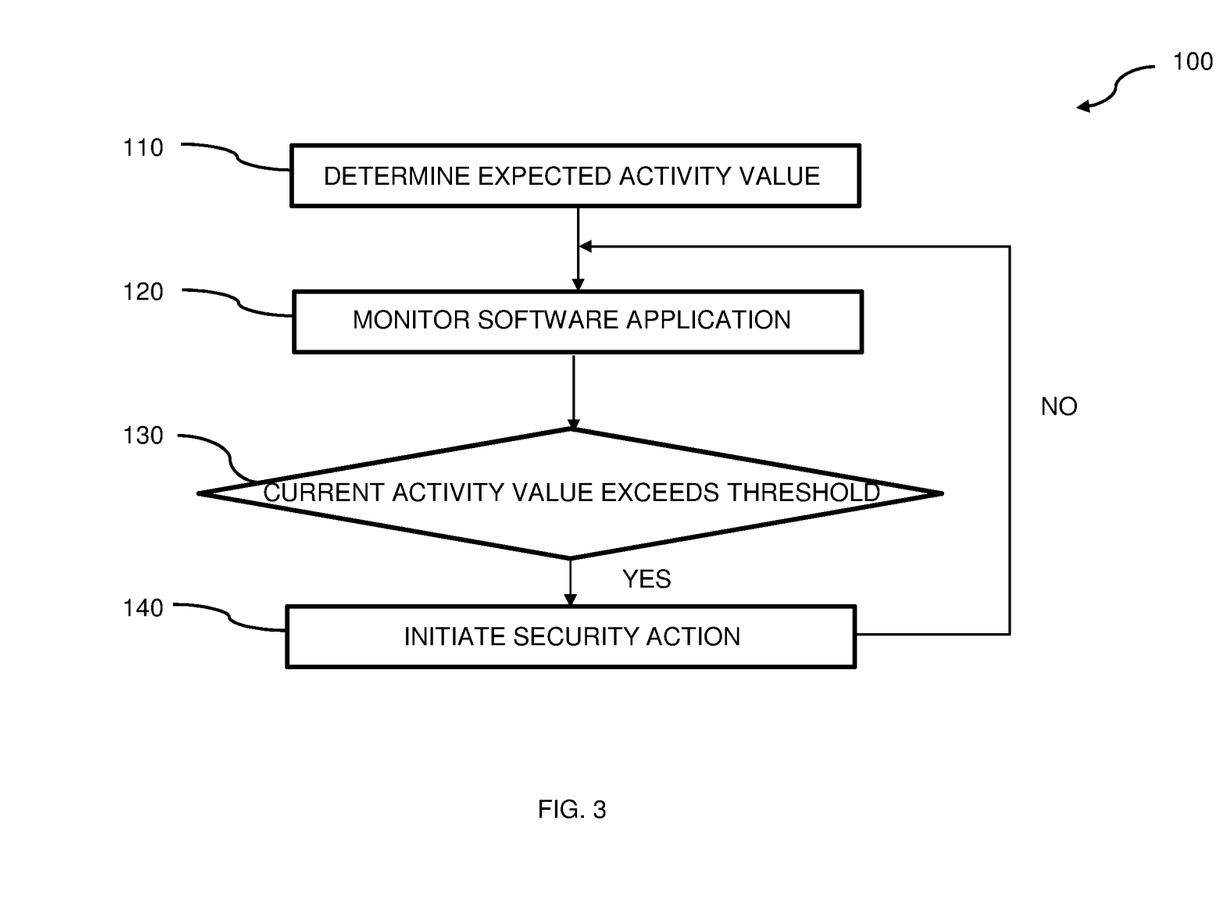
FIG. 3 is a method of operating the intrusion detection module of FIG. 1, 2A or 2B in accordance with one embodiment.

FIG. 3 illustrates a non-limiting example of a method 100. The method includes determining (step 110) an expected activity value associated with one or more software applications executing on a processor.

The method also includes monitoring (step 120) the one or more software applications executing on the processor to determine a current activity value associated with the one or more software applications.

The method also includes determining (step 130) whether the current activity value exceeds a threshold associated with the expected activity value.

The method also includes, in response to determining that the current activity value exceeds the threshold, initiating (step 140) one or more security actions associated with the one or more software applications.

In some examples, the step of determining the expected activity value associated with the one or more software applications executing on the processor comprises one or more of: determining a historical processor usage of the one or more software applications executing on the processor; determining a historical memory usage of the one or more software applications executing on the processor; and determining a historical network usage of the one or more software applications executing on the processor. In other examples, the step of determining the expected activity value associated with the one or more software applications comprises performing a statistical analysis of activity associated with the one or more software applications.

In some examples, the step of monitoring the one or more software applications executing on the processor to determine a current activity value associated with the one or more software applications comprises: determining a current processor usage of the one or more software applications executing on the processor; determining a current memory usage of the one or more software applications executing on the processor; determining a current network usage of the one or more software applications executing on the processor; detecting a change to a configuration file; detecting a response to a user input, or any combination thereof.

In some examples, the step of initiating the one or more security actions associated with the one or more software applications comprises: halting execution of the one or more software applications; disconnecting a communications link associated with the processor; preventing the processor from accessing the one or more software applications; deleting from the memory the one or more software applications; communicating a warning indicating that the current activity value exceeds the threshold, or any combination thereof.

In some examples, the step of communicating the warning indicating that the current activity value exceeds the threshold comprises one or more of: communicating a user prompt; and communicating an incident report.

While this invention has been described in terms of the preferred embodiments thereof, it is not intended to be so limited, but rather only to the extent set forth in the claims that follow.

I claim:

1. A system comprising:
an engine control unit of a computing system of a vehicle, the engine control unit configured to:
determine, based on a value stored in a memory of the computing system of a vehicle indicating a number of read or write operations to a memory of the engine control unit during a historical execution of a software application on the engine control unit, a respective expected activity value associated with the software application executing on the engine control unit;
monitor the software application executing on the engine control unit by executing a subroutine within the engine control unit that causes the engine control unit to determine a number of read or write operations to a memory of the engine control unit during a current execution of the software application within the engine control unit;
determine, based on the number of read or write operations to the memory of the engine control unit during the current execution of the software application within the engine control unit, a respective current activity value associated with the software application executing within the engine control unit;
determine whether the respective current activity value of the software application exceeds a threshold associated with the respective expected activity value; and
in response to determining that the respective current activity value of the software application exceeds the threshold, initiate one or more security actions associated with further execution of the software application within the engine control unit.

2. The system of claim 1, wherein the respective expected activity value associated with the software application executing on the engine control unit is further based on:
a historical network usage of the software application executing on the engine control unit.

3. The system of claim 1, wherein the respective expected activity value associated with the software application is based on a statistical analysis of activity associated with the software application executing on the engine control unit.

4. The system of claim 1, wherein the respective current activity value associated with the software application is further based on one or more of:
a current network usage of the software application executing on the engine control unit;
a change to a configuration file; and
a response by the system to a user input.

5. The system of claim 1, wherein the one or more security actions associated with the software application comprises one or more of:
halting execution of the software application;
disconnecting a communications link associated with the engine control unit;
preventing the engine control unit from accessing the software application;
deleting, from a memory, the software application; and
communicating a warning indicating that the respective current activity value of the software application exceeds the threshold.

6. The system of claim 5, wherein the warning indicating that the respective current activity value exceeds the threshold comprises one or more of:
a user prompt; or
an incident report.

7. The system of claim 1, wherein the engine control unit is associated with a computing system of an automobile.

8. A non-transitory computer readable storage medium that stores instructions configured to cause an engine control unit of a computing system of a vehicle to:
determine, based on a value stored in a memory of the computing system of a vehicle indicating a number of read or write operations to a memory of the engine control unit during a historical execution of a software application on the engine control unit, a respective expected activity value associated with the software application executing on the engine control unit;
monitor the software application executing on the engine control unit by executing a subroutine within the engine control unit that causes the engine control unit to determine a number of read or write operations to a memory of the engine control unit during a current execution of the software application within the engine control unit;
determine, based on the number of read or write operations to the memory of the engine control unit during the current execution of the software application within the engine control unit, a respective current activity value associated with the software application executing within the computing system of the vehicle;
determine whether the respective current activity value of the software application exceeds a threshold associated with the respective expected activity value; and in response to determining that the respective current activity value of the software application exceeds the threshold, initiate one or more security actions associated with further execution of the software application within the engine control unit.

9. The non-transitory computer readable storage medium of claim 8, wherein the instructions, when executed, configured the engine control unit to determine the respective expected activity value associated with the software application executing on the engine control unit further based on:
a historical network usage of the software application executing on the engine control unit.

10. The non-transitory computer readable storage medium of claim 8, wherein the respective expected activity value associated with the software application is based on a statistical analysis of activity associated with the software application executing on the engine control unit.

11. The non-transitory computer readable storage medium of claim 8, wherein the respective current activity value associated with the software application is further based on one or more of:

a current network usage of the software application executing on the engine control unit;
a change to a configuration file; and
a response by the computing system to a user input.

12. The non-transitory computer readable storage medium of claim 8, wherein the one or more security actions associated with the software application comprises one or more of:
halting execution of the software application;
disconnecting a communications link associated with the engine control unit;
preventing the engine control unit from accessing the software application;
deleting, from a memory, the software application; and
communicating a warning indicating that the respective current activity value of the software application exceeds the threshold.

13. The non-transitory computer readable storage medium of claim 12, wherein the warning indicating that the respective current activity value exceeds the threshold comprises one or more of:
a user prompt; or
an incident report.

14. A method comprising:
determining, based on a value stored in a memory of a computing system of a vehicle indicating a number of read or write operations to a memory of an engine control unit during a historical execution of a software application on the engine control unit, a respective expected activity value associated with the software application executing on the engine control unit of a computing system of a vehicle;
monitoring the software application executing on the engine control unit by executing a subroutine within the engine control unit that causes the engine control unit to determine a number of read or write operations to a memory of the engine control unit during a current execution of the software application within the engine control unit;
determine, based on the number of read or write operations to the memory of the engine control unit during the current execution of the software application within the engine control unit, a respective current activity value associated with the software application;
determining whether the respective current activity value of the software application exceeds a threshold associated with the respective expected activity value; and
in response to determining that the respective current activity value of the software application exceeds the threshold, initiating one or more security actions associated with further execution of the software application within the engine control unit.

15. The method of claim 14, wherein determining the respective expected activity value associated with the software application executing on the engine control unit is further based on:
a historical network usage of the software application executing on the engine control unit.

16. The method of claim 14, wherein determining the respective expected activity value associated with the software application comprises performing a statistical analysis of activity associated with the software application.

17. The method of claim 14, wherein monitoring the one or more software applications executing on the engine control unit to determine a respective current activity value associated with the software application further comprises:
determining a current network usage of the software application executing on the engine control unit;
detecting a change to a configuration file; and
detecting a response to a user input.

18. The method of claim 14, wherein initiating the one or more security actions associated with the software application comprises one or more of:
halting execution of the software application;
disconnecting a communications link associated with the engine control unit;
preventing the engine control unit from accessing the software application;
deleting, from a memory, the software application; and
communicating a warning indicating that the respective current activity value of the software application exceeds the threshold.

19. The method of claim 18, wherein communicating the warning indicating that the respective current activity value exceeds the threshold comprises one or more of:
communicating a user prompt; and
communicating an incident report.

20. The method of claim 14, wherein the engine control unit is associated with a computing system of an automobile.

* * * * *